(12) United States Patent  
Fini et al.

(10) Patent No.: US 7,257,293 B1
(45) Date of Patent: Aug. 14, 2007

(54) FIBER STRUCTURE WITH IMPROVED BEND RESISTANCE

(75) Inventors: John M. Fini, Jersey City, NJ (US); Siddharth Ramachandran, Hoboken, NJ (US)

(73) Assignee: Furukawa Electric North America, Inc., Norcross, GA (US)

( * ) Notice: Subject to any disclaimer, the term of this patent is extended or adjusted under 35 U.S.C. 154(b) by 0 days.

(21) Appl. No.: 11/487,258

(22) Filed: Jul. 14, 2006

(51) Int. Cl.
*G02B 6/26* (2006.01)

(52) U.S. Cl. .................... 385/32; 385/27; 385/28; 385/39; 385/123; 385/124; 385/125; 385/126; 385/127; 385/141; 385/142

(58) Field of Classification Search ............ 385/27–28, 385/32, 123–127, 141–142, 39
See application file for complete search history.

(56) References Cited

U.S. PATENT DOCUMENTS

| | | |
|---|---|---|
| 5,659,415 A | 8/1997 | Staver et al. |
| 5,818,630 A | 10/1998 | Fermann et al. |
| 6,496,301 B1 | 12/2002 | Koplow et al. |
| 6,539,155 B1 | 3/2003 | Broeng et al. |
| 6,614,975 B2 | 9/2003 | Richardson et al. |
| 6,711,918 B1 | 3/2004 | Kliner et al. |
| 6,772,611 B2 | 8/2004 | Kliner et al. |
| 6,801,550 B1 | 10/2004 | Snell et al. |
| 6,832,023 B1 | 12/2004 | Gaylord et al. |
| 6,853,786 B2 | 2/2005 | Russell et al. |
| 6,858,742 B2 | 2/2005 | Chou et al. |
| 6,882,786 B1 | 4/2005 | Kliner et al. |
| 6,894,828 B2 | 5/2005 | Pelouch et al. |
| 6,904,219 B1 | 6/2005 | Fermann |
| 6,990,282 B2 | 1/2006 | Russell et al. |
| 2003/0063884 A1 | 4/2003 | Smith et al. |
| 2004/0052484 A1* | 3/2004 | Broeng et al. .............. 385/125 |
| 2004/0065118 A1 | 4/2004 | Kliner et al. |
| 2004/0156607 A1 | 8/2004 | Farroni et al. |
| 2004/0247272 A1 | 12/2004 | Dawson et al. |
| 2004/0258353 A1 | 12/2004 | Gluckstad et al. |
| 2005/0008311 A1 | 1/2005 | Farroni et al. |
| 2005/0024716 A1 | 2/2005 | Nilsson et al. |
| 2005/0157998 A1 | 7/2005 | Dong et al. |
| 2005/0207455 A1 | 9/2005 | MacCormack et al. |

OTHER PUBLICATIONS

John, Fini; "Bend Resistant Design of Conventional and Microstructure Fibers With Very Large Mode Area" Jan. 9, 2006/vol. 14, No. 1/ Optics Express.
John Fini, Siddharth Ramachandran, "Bend Resistance of Large-Mode-Area Higher-Order-Mode Fibers", no data.

(Continued)

*Primary Examiner*—Frank G. Font
*Assistant Examiner*—Michael P. Mooney
(74) *Attorney, Agent, or Firm*—Wendy W. Koba

(57) ABSTRACT

A large mode area (LMA) fiber with improved resistance to bend-induced distortions utilizes highly oscillatory modes such that the effective index of the propagating modes remains less than the bent-fiber "equivalent" refractive index over a greater portion of the core. By providing a signal mode with a reduced effective index, the "forbidden" (evanescent) region of the core is reduced, and bend-induced distortion of the propagating mode is largely avoided.

18 Claims, 4 Drawing Sheets

OTHER PUBLICATIONS

S. Ramachandran, S. Ghalmi, J.W. Nicholson, M.F. Yan, P. Wisk, E. Monberg, F.V. Dimarcello, "Demonstration of Anamalous Dispersion in a Solid Silica Based Fiber at $\lambda<1300$ NM."

S. Ramachandran, J.W. Nicholson, J. Ghalmi, M.F. Yan, P. Wisk, E. Monberg, F.V. Dimarcello, "Light Propagation With Ultra Large Modal Areas in Optical Fibers" Jun. 15, 2006/vol. 31, No. 12/Optics Letters.

John Fini, "Bend Compensated Designs of Large-Mode-Area Fibers," Jul. 1, 2006/vol. 31, No. 13/ Optics Letters.

Siddharth Ramachandran, Zhiyong Wang, Man Yan, "Bandwidth Control of Long-Period Grating-Based Mode Converters in Few-Mode Fibers" May 1, 2002/vol. 27, No. 9/Optics Letters.

\* cited by examiner

FIBER STRUCTURE WITH IMPROVED BEND RESISTANCE

STATEMENT OF GOVERNMENT INTEREST IN INVENTION

This invention was made with the United States Government support under the NIST ATP program, award number 70NANB4H3035, awarded by the National Institute of Standards and Technology (NIST). The United States Government has certain rights in the invention.

TECHNICAL FIELD

The present invention relates to an optical fiber that exhibits improved resistance to bend-induced distortions and, more particularly, to a large mode area (LMA) fiber that supports the propagation of highly oscillatory modes that exhibit an effective index sufficiently below the refractive index of the core, so as to minimize bend-induced distortions.

BACKGROUND OF THE INVENTION

In the field of fiber optic technology, there is an increasing interest in the use of large mode area (LMA) fibers, particularly with respect to the fabrication of fiber-based optical amplifiers and the like, since large mode area fibers are known to overcome various nonlinear impairments, such as Raman and Brillouin scattering, thus enabling significant power increases over prior art fibers having conventional core configurations. However, the use of large mode area will increase the presence of fiber-related sensitivities such as macrobend losses, inter-mode coupling and sensitivities to nonuniformities in the fiber's refractive index profile.

There have been at least two different approaches in the prior art to developing LMA optical fibers suitable for high power amplification applications. In one approach, essentially a mechanical approach, rod-like fibers are utilized that are extremely bend resistant. By forcing the fibers to remain essentially straight, both the inter-modal coupling and the bending loss can be significantly reduced. However, in most "field" applications of such fibers, there is a need to bend, even spool, the fiber cables. Therefore, restricting the physical ability of the fiber to bend is considered to be an impractical solution. Another approach is associated with managing bend loss by defining the specific "spooling" to be used, and then always utilizing the fiber in accordance with the specified spooling radius (and number of turns).

While these solutions may be appropriately deployed with conventional fiber designs of moderately large mode area, they have not been found to be effective with LMA fiber, where the least amount of fiber bending (such as required for spooling fiber in the field) has been found to introduce significant distortions (e.g., reduction in the effective area) in the propagating signal mode. Conventional management of bend-induced losses and inter-modal coupling results in a fiber configuration with an effective area substantially reduced by bending.

Thus, a need remains in the art for providing a large mode area fiber whose mode intensity is not seriously distorted as the fiber is subjected to bending in various applications. Moreover, the ability to provide a distortion-resistant mode will result in reduced nonlinear impairment and may also have additional benefits, such as improved interaction of the signal mode with gain materials as compared to prior art distortion-sensitive modes.

SUMMARY OF THE INVENTION

The need remaining in the prior art is addressed by the present invention, which relates to an optical fiber that exhibits improved resistance to bend-induced changes and, more particularly, to a large mode area (LMA) fiber that supports the propagation of a highly oscillatory mode exhibiting an effective index less than the bent-fiber equivalent index across the core region, so as to minimize distortions.

In accordance with the present invention, the use of a highly oscillatory mode ("highly oscillatory" defined has having a large $\Delta n_{eff}$) within the fiber will result in minimal perturbations to the characteristics of the propagating signal as the fiber is bent. As the equivalent refractive index profile is modified by bending the fiber, the utilization of a highly oscillatory mode maintains the effective index of the propagating mode below the bend-induced equivalent index, thus allowing the propagating (highly oscillatory) mode to be spread across the core. In contrast, when propagating only the fundamental mode in a prior art LMA fiber, the effective index of the fundamental mode will be greater than the bend-induced equivalent index in a certain area, creating a "forbidden region". There is no "forbidden region" when using a highly oscillatory mode of an LMA fiber in accordance with the present invention.

In the case of a step-index fiber, a mode is considered to be "highly oscillatory" if the quantity $\Delta n_{eff} = n_{core} - n_{eff}$ is large. For a more complicated fiber design, there may be more than one refractive index present in the core, and in these cases $\Delta n_{eff}$ can be defined as follows:

$$\Delta n_{eff} = \overline{n}_{core} - n_{eff} = \sqrt{\int dA |E|^2 n^2} - n_{eff}, \text{ where}$$

dA is defined as the area integral and E is the optical field.

A mode is considered to be sufficiently "highly oscillatory" in accordance with the present invention if the typical bend radius is known, and the bent-fiber equivalent refractive index is greater than the effective index of that highly oscillatory mode. This can be expressed as $\Delta n_{eff} > \Delta n_{bend} \sim n_{core} R_{core}/R_{bend}$. Alternatively, a mode can be defined as sufficiently "highly oscillatory" (relative to conventional fibers) if $\Delta n_{eff} > 0.5(\lambda^2/A_{eff})$, or alternatively, $0.5(\lambda/R^{core})^2$ where the value "0.5" may be varied to some extent, as long as it remains less one, where the range of 0.25-1 has been found acceptable. Such modes will show substantial resistance to bend-induced distortion relative to conventional fibers, even if the typical bend radius is not known at the time of fabrication.

Other and further aspects and embodiments of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
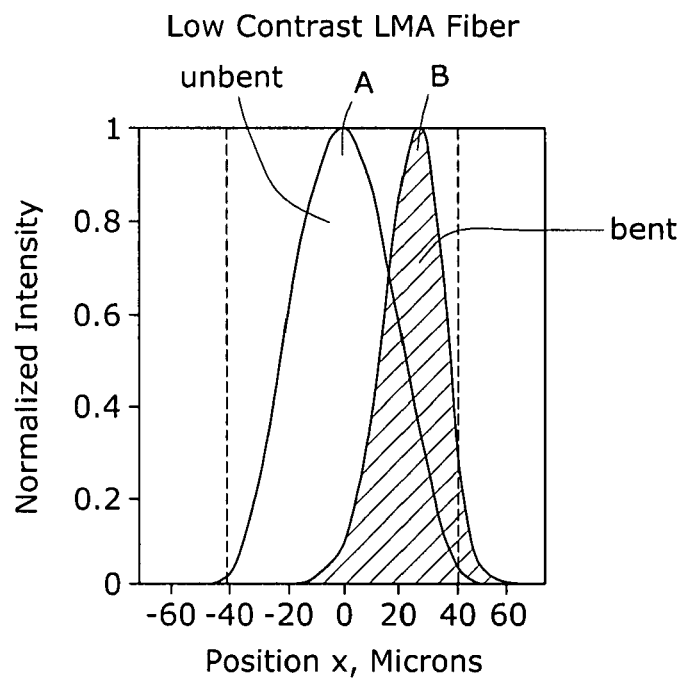
FIG. 1 contains intensity plots of a low contrast LMA fiber, both "before" and "after" bending.
Figure 2:
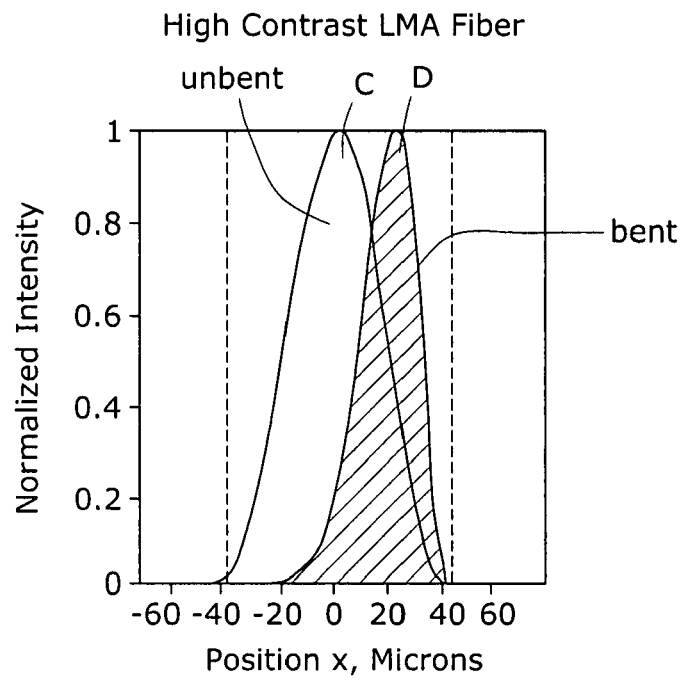
FIG. 2 contains similar "before" and "after" plots for a high contrast LMA fiber.

As core radii become large, and mode areas exceed ~600 µm² (i.e., large mode area, or LMA fiber), the impact of bend-induced distortion is significant for any bend radius relevant to conventional spooled-fiber packaging. This fact is illustrated in the diagrams of FIGS. 1 and 2, which illustrate the simulated mode profiles for two different LMA fibers, both "before" and "after" bending. FIG. 1 illustrates the mode profiles for a "low contrast" step index LMA optical fiber, with a $\Delta n$ on the order of 0.0005 (that is, $n_{core}-n_{cladding} \approx 0.0005$). Curve A in FIG. 1 illustrates the mode profile prior to bending, and Curve B is associated with a relatively "gentle" radius bend (on the order of 24 cm). The mode profile plots of FIG. 2 are associated with a relatively "high contrast" LMA fiber ($\Delta n = 0.01$). Curve C is associated with the "before bending" profile, and Curve D is a plot with the same bend radius (24 cm) as used for the LMA fiber of FIG. 1. In both cases, the fiber was selected to have the same (large) core radius ($R_{core}$) of 43 µm. In comparing the plots of FIGS. 1 and 2, it is evident that their mode fields are somewhat different, but both show essentially the same level of mode area reduction, even for this minimal bend value.

The significant bend-induced distortion associated with both this low contrast and high contrast LMA fiber can be explained by reference to FIG. 3, which illustrates the impact of fiber bending on the refractive index of an LMA fiber. As shown, plot I is a plot of the refractive index of a step-index LMA fiber, showing the conventional values of $n_{core}$ and $n_{clad}$. It is to be understood that while the following discussion is associated with the utilization of a step-index LMA fiber, the principles of the present invention are equally applicable to various other types of LMA fibers, such as graded-index fibers, parabolic index fibers, and the like. Referring back to FIG. 3, when allowing a conventional fundamental mode ($LP_{01}$) signal to propagate within this fiber, the "effective index" for this fundamental mode, defined as $n_{eff}$, is depicted as horizontal plot line II and lies a defined distance $\Delta n_{eff}$ below the core index $n_{core}$. Upon inducing a predetermined bend along the LMA fiber, the bent-fiber equivalent index $n_{bend}$ will shift in the manner shown by slanted plot line III of FIG. 3. Generally speaking, the equivalent/bend index may be defined as follows:

$$n_{bend}(x,y) \approx n(x,y)(1+x/R_{bend}),$$

where $R_{bend}$ is defined as the radius of curvature for the fiber bend.

Figure 3:
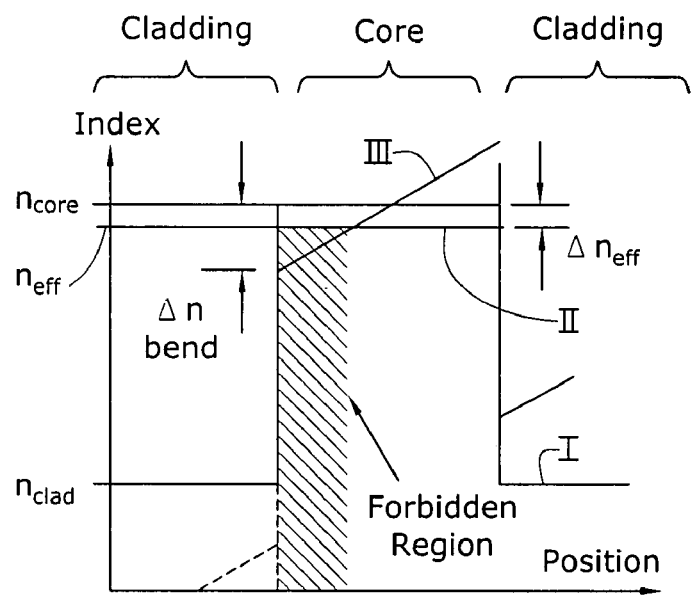
FIG. 3 is a diagram of a step-index refractive index profile for an LMA fiber, illustrating the change in the equivalent refractive index profile as the fiber experiences bending, as well as the location of the fundamental mode effective index.

An analysis of FIG. 3 allows for the estimation of the onset of large distortions. In particular, when the bend-induced index shift $\Delta n_{bend}$ becomes greater than the fundamental mode effective index $\Delta n_{eff}$, then part of the core has an equivalent refractive index smaller than the mode effective index. This portion of the core (shaded in FIG. 3) is a "forbidden" region, meaning that the wave is largely excluded from (or "evanescent" in) this part of the core. Since the mode is now forced out of a portion of the core, it will tend to have large distortion, significantly reduced effective area, and possibly reduced interaction with gain materials that may be present in the core. An intuitive condition for large distortion can then be expressed as follows:

$$\Delta n_{bend} = n_{core} R_{core}/R_{bend} > \Delta n_{eff} = |n_{core} - n_{eff}|.$$

This condition rapidly becomes more restrictive for LMA fibers. That is, not only does the bend-induced index grow, but the mode spacing decreases typically as $\Delta n_{eff} \sim (\lambda/R_{core})^2$.

Conversely, a useful condition for a mode to be substantially free of bend-induced distortion in accordance with the present invention can be expressed as follows:

$$\Delta n_{eff} > C \Delta n_{bend},$$

where "C" is a constant associated with the degree of bend-induced distortion that is tolerable. Inasmuch as the tolerance could be different for different applications, a range for C of approximately 0.5 to 1.5 ensures in most situations that the bend-induced distortion would have a relatively small impact on the effective area of the mode.

Prior art LMA fiber designs do not recognize or address this fundamental problem. In fact, while flattened-mode designs yield improved area for some LMA fiber cases, these designs actually worsen the bend-induced distortions of fibers with very large core size by decreasing $\Delta n_{eff}$. As mentioned above, regardless of total fiber contrast, the fundamental mode index difference $\Delta n_{eff}$ relevant to bend distortion is largely determined by core size, and so the utilization of a "high contrast" fiber (as opposed to low contrast) does not avoid distortion or solve the problem.

Figure 4:
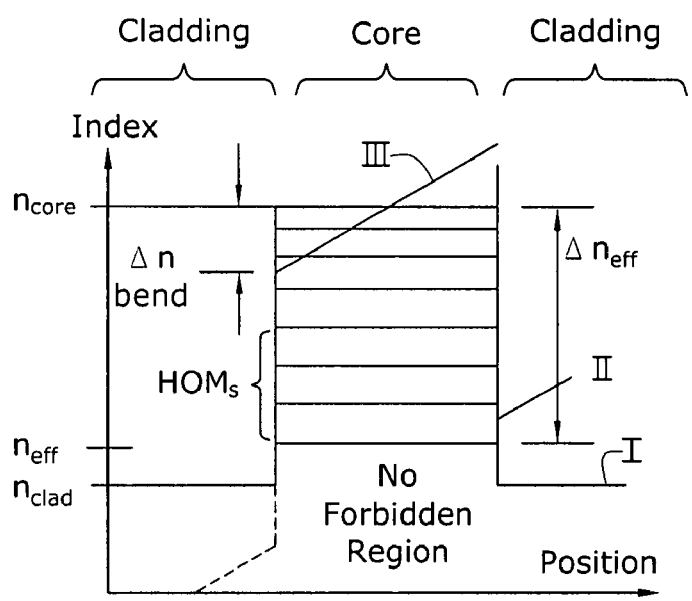
FIG. 4 is a diagram similar to that of FIG. 3, in this case illustrating the location of the effective index associated with HOM signals within an LMA fiber, clearly showing that the effective index for HOMs remains below the bend-induced equivalent index within the core area.

In one particular embodiment of the present invention, the above-defined condition is met by using modes of sufficiently high order such that $\Delta n_{eff} > C \Delta n_{bend}$. FIG. 4 contains a refractive index profile illustrating the relationship between the effective index of a higher-order mode (HOM) and the bent-fiber equivalent index. The diagram of FIG. 4 is based upon the same bend radius and core size as that of FIG. 3 and, therefore, plot III (the bent-fiber equivalent index) is identical. In accordance with the present invention, however, the utilization of HOMs has appreciably increased the value of $\Delta n_{eff}$, as shown. That is, there are a number of higher-order modes, such as $LP_{05}$, $LP_{07}$, and the like that remain well below the value of $n_{eq}$, eliminating the creation of a "forbidden region" when utilizing these higher-order modes. Therefore, even as the fiber is bent, these HOMs will propagate with little or no distortion within the large core area. Indeed, by knowing a particular range over which a fiber may be bent (for example, $R_{bend}$ between 3 and 40 cm), the core size and the associated refractive index values for the core and cladding, the appropriate HOMs can be determined and used that will substantially reduce distortions associated with fiber bending.

Figure 5:
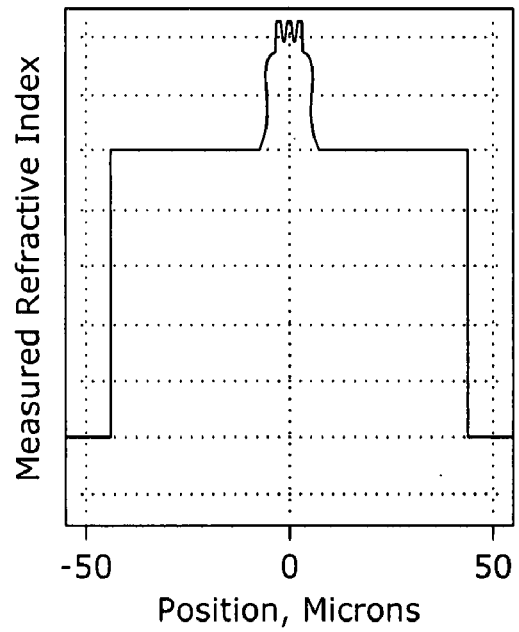
FIG. 5 contains a refractive index profile for an exemplary bend-resistant highly oscillatory LMA fiber formed in accordance with the present invention.

An exemplary refractive index profile of a fiber supporting highly oscillatory modes in accordance with the present invention is illustrated in FIG. 5. As shown, this particular profile is not a conventional "step index" profile, but is instead a multi-layered index that allows for more efficient input and output coupling to the highly oscillatory modes.

Figure 6:
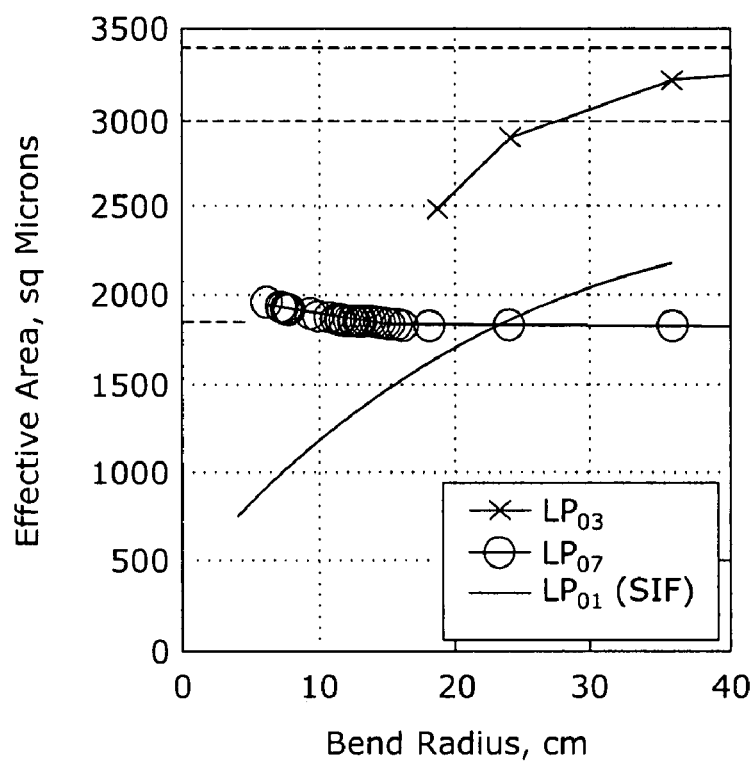
FIG. 6 is a plot of change in the core effective area as a function of fiber bend radius for both a conventional LMA fiber and a highly oscillatory LMA fiber of the present invention.

FIG. 6 contains a plot of effective core area (as measured in μm²) as a function of bend radius for two different higher-order-modes associated with the fiber having the refractive index profile of FIG. 5. For the sake of comparison, the effective core area for the fundamental mode of a similar step-index LMA fiber is also shown. It is clear that the essentially constant effective area associated with the $LP_{07}$ highly oscillatory mode substantiates its value in situations where bend-induced distortion is likely to occur. In contrast, both the $LP_{03}$ mode of the HOM LMA fiber and the fundamental mode of the step-index LMA fiber exhibit a significant reduction in effective area as function of bending over a bend radius range of 3-24 cm, a common range of bend radii that may be experienced by the fiber in field deployment. Thus, it is has been found in accordance with the present invention that it is not only important to choose an appropriate fiber, but also to select an appropriate LMA mode resistant to bend distortion.

Figure 7:
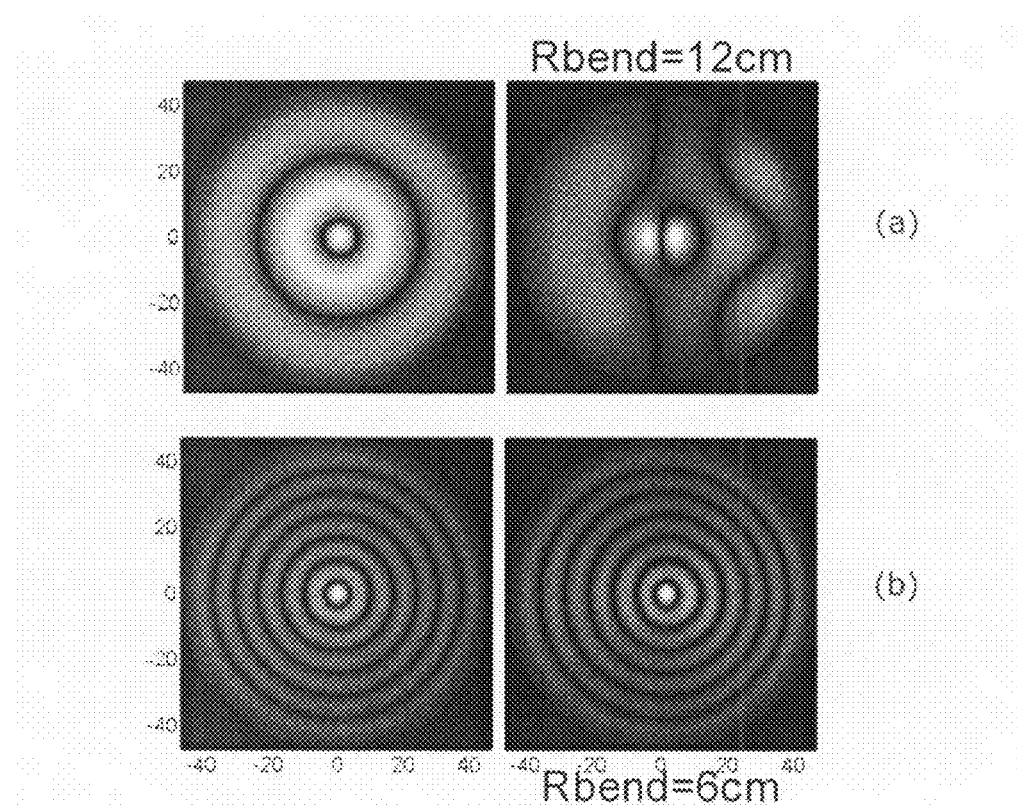
FIG. 7 contains simulated field profiles for two different higher-order-modes of the exemplary fiber of FIG. 5, for both "straight" fiber and "bent" fiber conditions.
Figure 8:
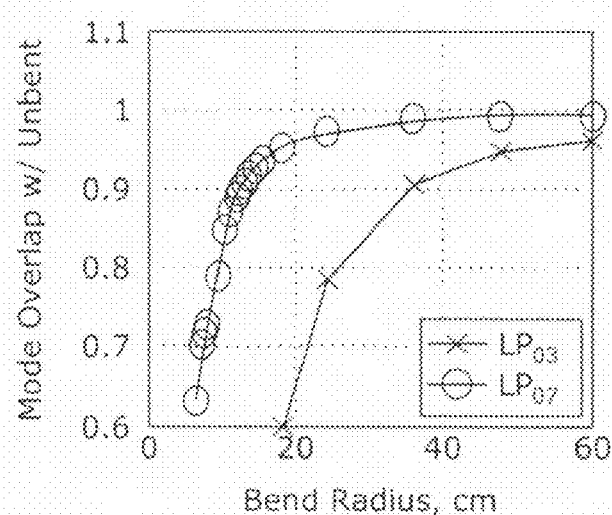
FIG. 8 is a plot of mode overlap between a "straight" fiber and "bent" fiber for the $LP_{03}$ (not sufficiently oscillatory) and $LP_{07}$ (highly oscillatory) modes of an HOM LMA fiber formed in accordance with the present invention.

FIG. 7 illustrates the simulated field profiles (square-root intensity in linear greyscale) for two different higher-order-modes of an HOM LMA fiber, in particular the $LP_{03}$ mode (not sufficiently highly oscillatory) and the $LP_{07}$ mode (sufficiently highly oscillatory in accordance with the present invention). As shown, the $LP_{03}$ mode undergoes large distortion as the conditions are changed from "straight" fiber to "bent" fiber. In contrast, the $LP_{07}$ mode undergoes very little distortion as bend conditions change. In particular, FIG. 7(a) contains profiles associated with the $LP_{03}$ mode, with a first plot (designated plot I) associated with "no bend" and plot II associated with a bend radius ($R_{bend}$) of 12 cm. The bend-induced distortion is clear in plot II. In contrast, FIG. 5(b) shows similar plots for the highly oscillatory $LP_{07}$ mode, with plot III associated with "no bend" and plot IV associated with $R_{bend}$=6 cm. Little or no distortion is evident in plot IV even though the bend is more severe than that associated with plot II. This is the case, in accordance with the findings of the present invention, since the $LP_{07}$ mode lies at $\Delta n_{07}$=0.0047, which is several times greater than $\Delta n_{bend}$=0.001 for a 6 cm bend. As discussed above, the estimate for the onset of large distortion occurs at $R_{bend}$=$nR_{core}/\Delta n$, which has the value of 11 cm for $LP_{03}$ (a lower mode case) and 1.3 cm for $LP_{07}$, so that the $LP_{03}$ mode has moderate bend-induced distortion resistance (better than the fundamental mode) and $LP_{07}$ demonstrates excellent immunity to bend-induced distortion in accordance with the present invention.

Another advantage of utilizing HOM LMA fiber in accordance with the present invention is that the HOM signals display resistance to mode-to-mode coupling along a fiber. FIG. 7 is a plot of simulated mode overlaps (bent/unbent) for both a conventional fiber and an exemplary HOM LMA fiber of the present invention, The overlap shows some evidence that the higher order mode reduces inter-mode coupling, since overlap values substantially less than "one" can give rise to mode coupling at bend transitions. Effective use of an LMA fiber in accordance with the present invention will require coupling of signals into or out of the bend-resistant highly oscillatory mode of the fiber. This coupling can be accomplished, for example, by using a grating, taper, phase plate, bulk optics, or the like. The fiber core profile can exhibit the conventional step-index shape. Alternatively, various core index profiles may be used to improve mode coupling, bend losses and/or other properties. Such profiles may included graded-index, parabolic, or two-layer profiles. Important applications of such a fiber formed in accordance with the present invention include fiber amplifiers and lasers. For these applications (and others), it may be desirable to have multiple signals guided within the fiber, either in the same mode or different modes. For example, one might amplify a signal in the bend-resistant signal mode of the fiber as described above, and also provide guidance of pump light in other modes. Gain materials may be incorporated into the fiber of the present invention. Other structures, such as pump-guiding double-clad, air-clad or low-index coating may be found in a fiber formed in accordance with the present invention. Indeed, the gain can be configured to interact strongly with the signal mode, while only weakly interacting with noise modes (for example) by arranging the gain materials at the peaks of the signal mode intensity. The inventive fiber may further comprise a microstructured core and/or cladding regions, may be particularly configured to minimize polarization dependences, or may be configured to exhibit a predetermined (and essentially constant) polarization dependence (such as birefringence).

It will be apparent to those skilled in the art that various modifications and variations can be made to the present invention without departing from the spirit and scope of the invention. In particular, while the various aspects of the present invention have been described in association with a step-index LMA fiber, various other types of LMA fiber may be used, such as graded-index fiber, as long as the fiber is capable of supporting higher-order modes (HOMs) where the fiber's effective index remains less than the bend-induced equivalent index for a given range of bend radii. Thus it is intended that the present invention cover the modifications and variations of this invention, provided they come within the scope of claims appended hereto, and their equivalents.

What is claimed is:

1. A method for propagating an optical signal in a large-mode-area (LMA) optical fiber such that bend-induced distortions are minimized, the method comprising the steps of:

providing an LMA fiber having a core region with a radius defined as $R_{core}$ and a refractive index defined as $n_{core}$, said LMA fiber exhibiting a bent-fiber index of $\Delta n_{bend}$ as said LMA fiber is bent along a predetermined bend radius $R_{bend}$; and coupling an output signal from a highly oscillatory mode signal propagating at a defined wavelength λ within the LMA optical fiber, the highly oscillatory mode signal exhibiting an effective mode area $A_{eff}$, the highly oscillatory mode selected to exhibit an effective index $n_{eff}$ such that $n_{core}$−$n_{eff}$ ($\Delta n_{eff}$) is greater than a predetermined threshold value sufficient to minimize bend-induced distortions.

2. The method as defined in claim 1 wherein the predetermined threshold value is defined as $C_1 \Delta n_{bend}$, where $C_1$ is a predetermined constant associated with a tolerable degree of bend-induced distortion.

3. The method as defined in claim 2 wherein the predetermined constant $C_1$ has a value in the range of approximately 0.5 to approximately 1.5.

4. The method as defined in claim 2 wherein $\Delta n_{bend}$ is approximately equal to $n_{core}R_{core}/R_{bend}$.

5. The method as defined in claim 4 wherein $R_{bend}$ is approximately in the range of 3 cm to 24 cm.

6. The method as defined in claim 1 wherein the predetermined threshold value is defined as $C_2(\lambda^2/A_{eff})$, where $C_2$ is a predetermined constant associated with a tolerable degree of bend-induced distortion.

7. The method as defined in claim 6 wherein the predetermined constant $C_2$ has a value in the range of approximately 0.25 to approximately 1.0.

8. The method as defined in claim 1 wherein the predetermined threshold value is defined as $C_3(\lambda/R_{core})^2$, where $C_3$ is a predetermined constant associated with a tolerable degree of bend-induced distortion.

9. The method as defined in claim 8 wherein the predetermined constant $C_3$ has a value in the range of approximately 0.25 to approximately 1.0.

10. The method as defined in claim 1 wherein the effective core area $A_{eff}$ is greater than 600 µm².

11. The method as defined in claim 1 wherein the highly oscillatory mode signal comprises a higher-order mode with an effective index below the effective index of the $LP_{03}$ mode.

12. The method as defined in claim 1 wherein the LMA fiber includes gain material within the core region.

13. The method as defined in claim 12 wherein the gain material is configured to interact strongly with the highly oscillatory mode signal and only weakly within remaining noise modes.

14. The method as defined in claim 13 wherein the gain is arranged at the peaks of the highly oscillatory mode signal.

15. The method as defined in claim 1 wherein the LMA fiber exhibits a refractive index profile configured to allow for efficient coupling of the highly oscillatory signal into or out of said LMA fiber.

16. The method as defined in claim 1 wherein the LMA fiber comprises a microstructured region.

17. The method as defined in claim 16 wherein the LMA fiber comprises a microstructured core region.

18. The method as defined in claim 16 wherein the LMA fiber comprises a microstructured cladding region.

* * * * *